United States Patent
Butts et al.

(10) Patent No.: US 6,477,849 B2
(45) Date of Patent: Nov. 12, 2002

(54) METHOD AND APPARATUS FOR TESTING HEAT PUMPS

(75) Inventors: Charles G. Butts, Weaverville, NC (US); Richard H. Bair, III, Asheville, NC (US); Mark R. Lunsford, Arden, NC (US)

(73) Assignee: Kendro Laboratory Products, Inc., Asheville, NC (US)

( * ) Notice: Subject to any disclaimer, the term of this patent is extended or adjusted under 35 U.S.C. 154(b) by 0 days.

(21) Appl. No.: 09/876,037

(22) Filed: Jun. 8, 2001

(65) Prior Publication Data

US 2002/0083722 A1 Jul. 4, 2002

Related U.S. Application Data

(60) Provisional application No. 60/258,546, filed on Dec. 29, 2000.

(51) Int. Cl.[7] .......................... F25B 13/00; G01K 13/00
(52) U.S. Cl. ........................................ 62/129; 62/160
(58) Field of Search .......................... 62/129, 127, 160, 62/228.1

(56) References Cited

U.S. PATENT DOCUMENTS

| | | | |
|---|---|---|---|
| 4,504,156 A | * 3/1985 | Currie et al. ................. | 374/45 |
| 5,438,844 A | * 8/1995 | Hoglund et al. ............... | 62/155 |
| 5,628,199 A | * 5/1997 | Hoglund et al. ............... | 62/155 |
| 6,246,969 B1 | * 6/2001 | Sinclair et al. ............. | 702/113 |
| 6,354,093 B2 | * 3/2002 | Davis et al. ................... | 62/89 |

* cited by examiner

Primary Examiner—Denise L. Esquivel
Assistant Examiner—Marc Norman
(74) Attorney, Agent, or Firm—Baker & Hostetler L.L.P.

(57) ABSTRACT

Plural testing stations are provided for simultaneously testing plural refrigeration systems and include resistive heaters for applying heat to selected portions of the refrigeration systems and include monitoring and control devices and a data acquisition and control system which are connected to a programmable monitoring and controlling computer system. The monitoring and control devices include temperature sensors attached to portions of refrigeration systems and include control devices for controlling the resistive heaters and the refrigeration systems. As a result, simultaneous testing of a plurality of testing stations is automated. The programmable monitoring and controlling computer system collects measurement data and compares the measurement data to reference data to determine if the refrigeration systems pass or fail the tests.

13 Claims, 5 Drawing Sheets

| Digital Ch | PDAQ | Group | Name | Analog Ch | PDAQ | Group | Name |
|---|---|---|---|---|---|---|---|
| 1 | 153913 | 1 | Comp | 1 | 153913 | 1a | tc0 |
| 2 | 153913 | 1 | Small Htr | 2 | 153913 | 1a | tc1 |
| 3 | 153913 | 1 | Large Htr | 3 | 153913 | 1a | tc2 |
| 4 | 153913 | 1 | Sol #1 | 4 | 153913 | 1b | tc0 |
| 5 | 153913 | 1 | Sol #2 | 5 | 153913 | 1b | tc1 |
| 6 | 153913 | 2 | Comp | 6 | 153913 | 1b | tc2 |
| 7 | 153913 | 2 | Small Htr | 7 | 153913 | 1c | tc0 |
| 8 | 153913 | 2 | Large Htr | 8 | 153913 | 1c | tc1 |
| 9 | 153913 | 2 | Sol #1 | 9 | 153913 | 1c | tc2 |
| 10 | 153913 | 2 | Sol #2 | 10 | 153913 | 2a | tc0 |
| 11 | 153913 | 3 | Comp | 11 | 153913 | 2a | tc1 |
| 12 | 153913 | 3 | Small Htr | 12 | 153913 | 2a | tc2 |
| 13 | 153913 | 3 | Large Htr | 13 | 153913 | 2b | tc0 |
| 14 | 153913 | 3 | Sol #1 | 14 | 153913 | 2b | tc1 |
| 15 | 153913 | 3 | Sol #2 | 15 | 153913 | 2b | tc2 |
| 16 | 153913 | NOT USED | | 16 | 153913 | 2c | tc0 |
| | | | | 17 | 153913 | 2c | tc1 |
| | | | | 18 | 153913 | 2c | tc2 |
| | | | | 19 | 153913 | 3a | tc0 |
| | | | | 20 | 153913 | 3a | tc1 |
| | | | | 21 | 153913 | 3a | tc2 |
| | | | | 22 | 153913 | 3b | tc0 |
| | | | | 23 | 153913 | 3b | tc1 |
| | | | | 24 | 153913 | 3b | tc2 |
| | | | | 25 | 153913 | 3c | tc0 |
| | | | | 26 | 153913 | 3c | tc1 |
| | | | | 27 | 153913 | 3c | tc2 |
| | | | | 28 | 153913 | NOT USED | NOT USED |
| | | | | 29 | 153913 | NOT USED | NOT USED |
| | | | | 30 | 153913 | NOT USED | NOT USED |

FIG. 3B

| Digital | | | |
|---|---|---|---|
| Ch | PDAQ | Group | Name |
| 1 | 154198 | 4 | Comp |
| 2 | 154198 | 4 | Small Htr |
| 3 | 154198 | 4 | Large Htr |
| 4 | 154198 | 4 | Sol #1 |
| 5 | 154198 | 4 | Sol #2 |
| 6 | 154198 | 5 | Comp |
| 7 | 154198 | 5 | Small Htr |
| 8 | 154198 | 5 | Large Htr |
| 9 | 154198 | 5 | Sol #1 |
| 10 | 154198 | 5 | Sol #2 |
| 11 | 154198 | NOT USED | NOT USED |
| 12 | 154198 | NOT USED | NOT USED |
| 13 | 154198 | NOT USED | NOT USED |
| 14 | 154198 | NOT USED | NOT USED |
| 15 | 154198 | NOT USED | NOT USED |
| 16 | 154198 | NOT USED | NOT USED |

| Analog | | | |
|---|---|---|---|
| Ch | PDAQ | Group | Name |
| 1 | 154198 | 4a | tc0 |
| 2 | 154198 | 4a | tc1 |
| 3 | 154198 | 4a | tc2 |
| 4 | 154198 | 4b | tc0 |
| 5 | 154198 | 4b | tc1 |
| 6 | 154198 | 4b | tc2 |
| 7 | 154198 | 4c | tc0 |
| 8 | 154198 | 4c | tc1 |
| 9 | 154198 | 4c | tc2 |
| 10 | 154198 | 5a | tc0 |
| 11 | 154198 | 5a | tc1 |
| 12 | 154198 | 5a | tc2 |
| 13 | 154198 | 5b | tc0 |
| 14 | 154198 | 5b | tc1 |
| 15 | 154198 | 5b | tc2 |
| 16 | 154198 | 5c | tc0 |
| 17 | 154198 | 5c | tc1 |
| 18 | 154198 | 5c | tc2 |
| 19 | 154198 | | - AMBIENT - Group 1 |
| 20 | 154198 | | - AMBIENT - Group 2 |
| 21 | 154198 | | - AMBIENT - Group 3 |
| 22 | 154198 | | - AMBIENT - Group 4 |
| 23 | 154198 | | - AMBIENT - Group 5 |
| 24 | 154198 | | NOT USED |
| 25 | 154198 | | NOT USED |
| 26 | 154198 | | NOT USED |
| 27 | 154198 | | NOT USED |
| 28 | 154198 | | NOT USED |
| 29 | 154198 | | NOT USED |
| 30 | 154198 | | NOT USED |

FIG. 4

METHOD AND APPARATUS FOR TESTING HEAT PUMPS

RELATED APPLICATION

This application claims priority based upon copending U.S. Provisional Application No. 60/258,546, filed Dec. 29, 2000, and incorporated herein by reference.

FIELD OF THE INVENTION

The present invention relates to testing heat pumps. More particularly, the present invention relates to testing a plurality of heat pumps simultaneously and under electronic control to ascertain if the heat pumps meet reference heat pump performance specifications.

BACKGROUND OF THE INVENTION

An important part of the manufacturing process is the testing of the manufactured products to determine if they satisfy predetermined specifications. Generally, the specifications provide a range of acceptable values, and for a product to pass the testing, the test results for the product should be within the range of acceptable values.

As background to a discussion of a specific class of products, it is well known that heat spontaneously flows from a high temperature heat source to a low temperature heat sink. However, when it is desired to reverse this spontaneous process and have heat transferred from a low temperature heat source to a high temperature heat sink, then a heat pump must be employed.

An electric refrigerator is a form of a heat pump. An electric refrigerator generally includes five basic parts: (1) the receiver; (2) the refrigerant-control device; (3) the evaporator; (4) the compressor; and (5) the condenser. The receiver serves as the low temperature heat source which is cooled by the electric refrigerator. The room in which the electric refrigerator is located serves as a high temperature heat sink. The evaporator is run at a lower temperature than the low temperature heat source (the inside of the receiver) and receives heat from the low temperature heat source, thereby cooling the inside of the receiver. The condenser is run at a higher temperature than the high temperature heat sink and transfers heat to the high temperature heat sink, the room in which the refrigerator is located.

Relevant tests relating to the performance of an electric refrigerator can be concerned with the ability of the electric refrigerator to pump adequate amounts of heat out from the low temperature heat source, for a specified range of heat loads in the low temperature heat source, to maintain the low temperature heat source in a desired temperature range. If the electric refrigerator can maintain the low temperature heat source in the desired temperature range for the specified range of heat loads, then the electric refrigerator is adequate. On the other hand, if the electric refrigerator can not maintain the low temperature heat source in the desired temperature range for the specified range of heat loads, then the electric refrigerator is inadequate.

With respect to the testing of refrigeration systems, existing technology dictates that the critical parameters of a refrigeration system be manually recorded at specific points in time in relationship to the testing cycle in order to determine performance characteristics. Due to a system's relatively low volumetric size, temperature changes occur very rapidly during the cool down and warm up cycles of a testing cycle. Inaccuracy in manual measurements can occur due to the occurrence of rapid temperature transitions as a result of a system's dynamics and size. Moreover, manual testing of multiple refrigeration systems undergoing similar testing cycles simultaneously is virtually impossible. By the time a manual tester has finished taking a measurement on a first refrigeration system, it may already be too late to take a comparable measurement in a second refrigeration system. Results for manual testing of third, fourth, etc. additional refrigeration systems would be much too late and highly inaccurate.

The ability to test multiple refrigeration systems simultaneously is very important. When multiple refrigeration systems are manufactured, if the multiple refrigeration systems cannot be tested rapidly and accurately, the entire manufacturing process is impeded. If numerous employees are assigned the task of testing, so that testing can be completed promptly and accurately, testing costs would be unacceptably high and therefor uneconomical.

It would therefore be desirable if a testing apparatus and method were provided for heat pumps in general, and refrigeration systems in particular, wherein critical parameters are tested automatically and under computer control. Moreover, it would be desirable if such a testing apparatus and method were provided in which multiple heat pumps, in general, and multiple refrigeration systems, in particular, can be tested simultaneously.

SUMMARY OF THE INVENTION

The present invention satisfies, to a great extent, the need for testing a plurality of heat pumps simultaneously, under electronic control, and with automatic processing of test data. This result is achieved by the testing apparatus of the invention. In general terms, the testing apparatus of the invention includes an array of testing stations, wherein each of the testing stations includes at least one tester heat exchanger for attachment to at least one designated component of a selected heat pump. Each of the testing stations includes at least one temperature sensor for placing against the designated components of the selected heat pump. An array of data acquisition channels are in communication with the array of testing stations. Each of the data acquisition channels includes a data acquisition channel for each temperature sensor. A data logging system is provided which is in communication with the array of data acquisition channels. The data logging system monitors the temperature sensors and logs temperature readings versus time readings. Also, the data logging system computes heat pump performance information based upon the logged temperature and time readings. The data logging system can provide graphs which depict heat pump performance information versus time.

In addition, the data logging system can compare reference heat pump performance specifications with the computed heat pump performance information and can determine whether the selected heat pump for each testing station passes or fails the reference heat pump performance specifications.

Preferably, the array of testing stations is organized into groups of testing stations. Similarly, preferably, the array of data acquisition channels is organized into groups of data acquisition channels corresponding to the groups of testing stations. Each of the groups of data acquisition channels are organized into groups of multiple member data acquisition channels corresponding to the member testing stations. Each of the groups of member data acquisition channels include data acquisition channels for the temperature sensors.

Aside from monitoring heat pump performance during testing, the testing procedure can also include active control of the heat pumps undergoing testing. In this regard, each of the groups of testing stations can further include control devices for controlling operation of heat pumps associated with the member testing stations in each respective group of testing stations. In addition, groups of device control channels are provided, and each of the groups of device control channels includes device control channels for controlling the respective control devices in each of the respective groups of testing stations. Also, a device control system is provided for controlling the control devices.

Preferably, the data logging system and the device control system are combined in a programmable monitoring and controlling computer system. Also, preferably, the data acquisition channels and the device control channels are combined in a data acquisition and control system. Preferably, the data acquisition channels are analog channels, and the device control channels are digital channels, and the data acquisition and control system includes analog-to-digital converters for the analog channels.

Preferably, the data acquisition and control system includes a linear array of hook-up panels. The linear array of hook-up panels is grouped into groups of hook-up panels. Each of the groups of hook-up panels includes unit hook-up panels. Each of the groups of hook-up panels includes groups of controlling connector wires for connecting to respective tester heat exchangers and respective controlled portions of each heat pump under test. Each of the groups of hook-up panels includes groups of monitor connector wires for connecting to the respective temperature sensors for each heat pump under test. In this respect, preferably, each unit hook-up panel includes monitor connector wires for connecting to the respective temperature sensors for each heat pump under test and controlling connector wires for connecting to respective tester heat exchangers and respective controlled portions of each heat pump under test.

In more specific terms, this invention pertains to the specific design of an automated process control and testing system for the evaluation of performance characteristics of a stand alone refrigeration system. All critical parameters are monitored and compared to computerized, built-in pass/fail criteria. By applying specific evaporative temperature loads, and on completion of the automated testing protocol, the automated system issues a result-based temperature log designating system performance and indicating if the refrigeration system is in or out of compliance.

In another aspect of the invention, this invention pertains to the specific design of an automated process control and testing system for the evaluation of performance characteristics of a plurality of stand alone refrigeration systems. For each refrigeration system under test, critical parameters are monitored and compared to computerized, built-in pass/fail criteria. By applying specific evaporative temperature loads, and on completion of the automated testing protocol, the automated system issues a result-based temperature and time log designating system performance and indicating if the refrigeration system is in or out of compliance.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS

Figure 1:
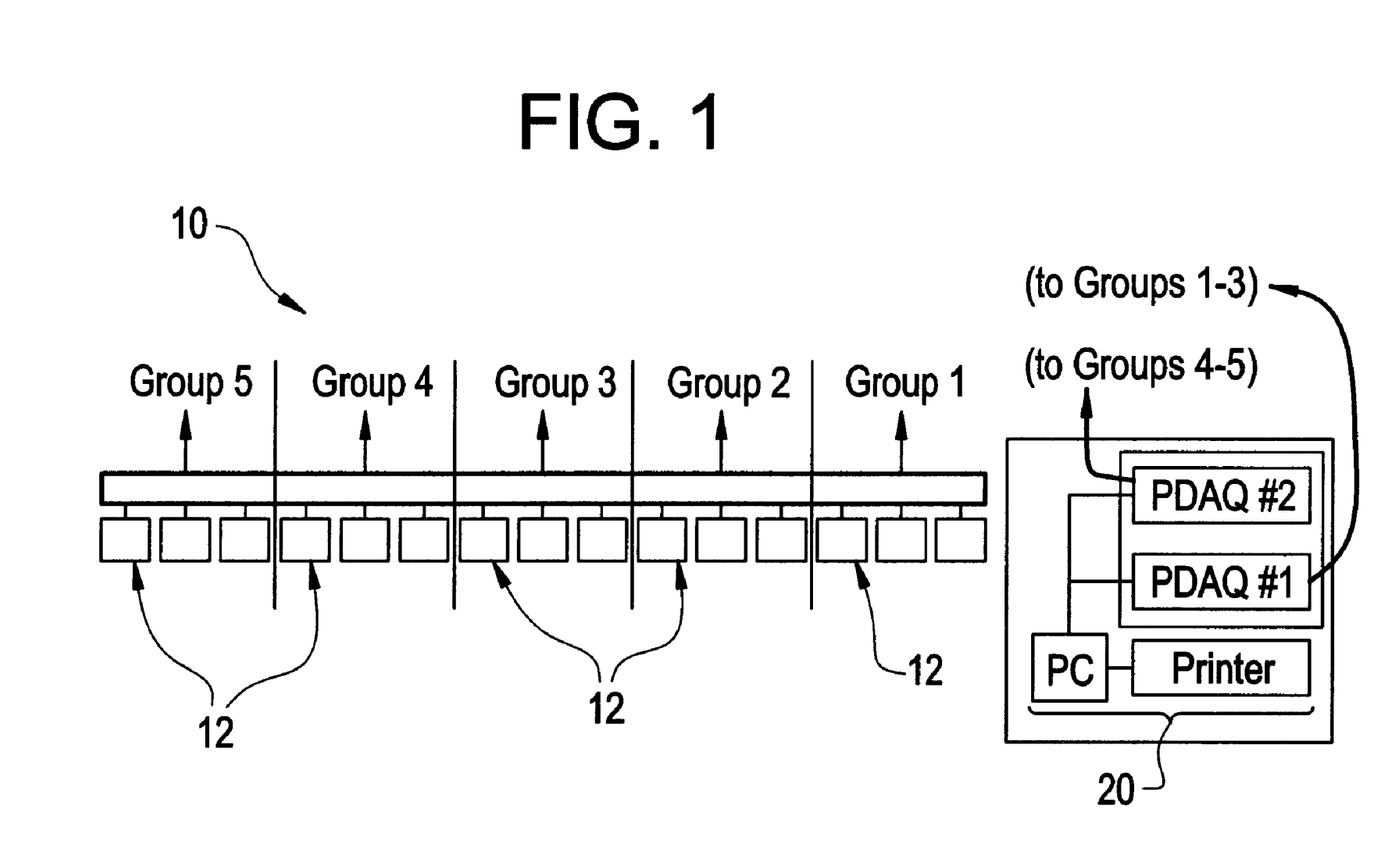
FIG. 1 is a block diagram illustrating a preferred embodiment of a refrigeration testing system in accordance with a preferred embodiment of the present invention.

Referring now to the figures wherein like reference numerals indicate like elements, in FIG. 1 a testing apparatus 10 is provided for simultaneously testing a plurality of heat pumps 11.

In a manufacturing facility for an electric refrigerator equipment, the combination of an evaporator, a compressor, a condenser and associated tubing and electronics can be regarded as a heat pump, and the heat pump may be manufactured prior to assembly with a receiver and the refrigerant-control device. If the heat pump is to be sold separate from the receiver, it is important that a method of testing the heat pump be developed.

More specifically, a test of a heat pump can involve a testing cycle. A testing cycle can focus on the evaporator. A testing cycle that focuses on the evaporator can involve subjecting the evaporator to a measured heat load for a measured period of time and also measuring the temperature of the evaporator, during operation of the refrigeration system, at timed intervals, under the heat load, to ascertain if the refrigeration system can maintain the evaporator in a range of acceptable temperature values. If the refrigeration system can maintain the evaporator in the range of acceptable temperature values during the testing cycle, then the refrigeration system passes the test. On the other hand, if the refrigeration system cannot maintain the evaporator in the range of acceptable temperature values during the testing cycle, then the refrigeration system fails the test. Such failed refrigeration systems would not be combined with other components to form fully assembled electric refrigerators.

Figure 2:
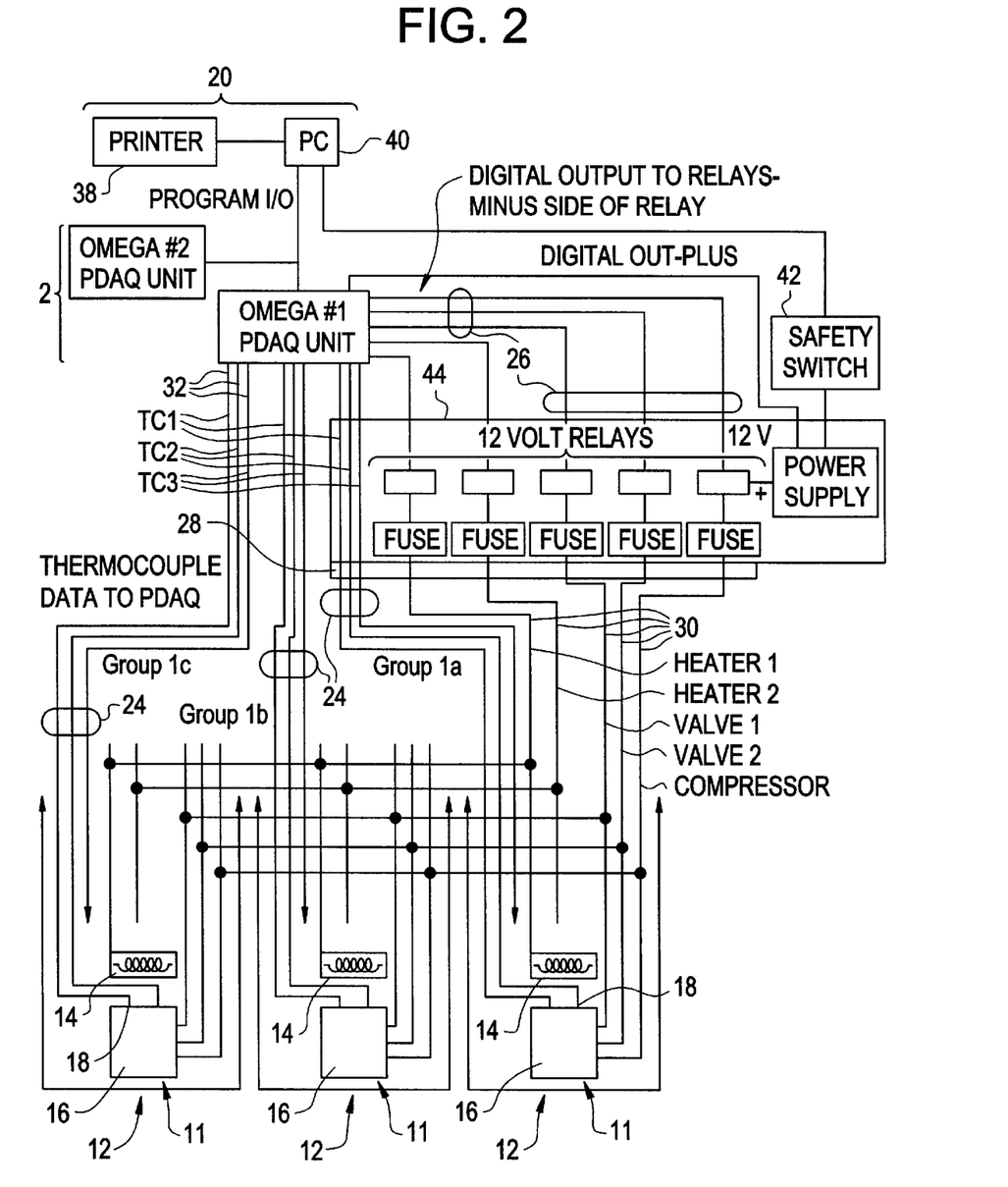
FIG. 2 is a block diagram illustrating one test station of the testing system of FIG. 1.

In general terms, with reference to FIGS. 1 and 2, the testing apparatus 10 includes an array of testing stations 12, wherein each of the testing stations includes tester heat exchangers 14 for attachment to designated components of a selected heat pump 16. Such designated components would include the evaporator component of the heat pump. Each of the testing stations includes temperature sensors 18 for placing against the designated components of the selected heat pump. An array of groups of data acquisition channels are in communication with the array of testing stations. Each of the groups of data acquisition channels includes data acquisition channels 24 for the temperature sensors 18. In the preferred embodiment shown, three data acquisition channels 24 are provided for each test station 12 to receive data from three sensors 18. As depicted, and as discussed below, only two of the three sensors may be used on the third may also be employed as an auxiliary sensor. A data logging system is provided which is in communication with the array of groups of data acquisition channels. The data logging system monitors the temperature sensors 18 and logs temperature readings versus time readings. Also, the data logging system computes heat pump performance information based upon the logged temperature and time readings. The data logging system can provide graphs which depict heat pump performance information versus time.

In addition, the data logging system can compare reference heat pump performance specifications with the computed heat pump performance information and can determine whether the selected heat pump for each testing station passes or fails the reference heat pump performance specifications.

Preferably, the array of testing stations is organized into groups of testing stations. In addition, each group of testing stations has multiple member testing stations.

Similarly, preferably, the array of groups of data acquisition channels is organized into groups of data acquisition channels corresponding to the groups of testing stations. Each of the groups of data acquisition channels is organized into groups of member data acquisition channels corresponding to the member testing stations. Each of the groups of member data acquisition channels includes data acquisition channels 24 for the temperature sensors 18.

In addition to monitoring heat pump performance during testing, the testing procedure can also include active control of the heat pumps undergoing testing. In this regard, each of the groups of testing stations can further include control devices, e. g. relays 44, for controlling operation of heat pumps associated with the member testing stations in each respective group of testing stations. In addition, groups of device control channels 26 are provided, and each of the groups of device control channels includes device control channels for controlling the respective control devices in each of the respective groups of testing stations. Also, a device control system is provided for controlling the groups of the control devices.

Preferably, the data logging system and the device control system are combined in a programmable monitoring and controlling computer system 20. Also, preferably, the data acquisition channels and the device control channels are combined in a data acquisition and control system 22. Preferably, the data acquisition channels are analog channels, and the device control channels are digital channels, and the data acquisition and control system 22 includes analog-to-digital converters for the analog channels.

Preferably, the data acquisition and control system includes a linear array of hook-up panels. The linear array of hook-up panels is grouped into groups of hook-up panels.

Each of the groups of hook-up panels includes unit hook-up panels 28. Each of the groups of hook-up panels includes groups of controlling connector wires 30 for connecting to respective tester heat exchangers 14 and respective controlled portions of each heat pump 11 under test. Each of the groups of hook-up panels includes groups of monitor connector wires 32 for connecting to the respective temperature sensors for each heat pump 11 under test. In this respect, preferably, each unit hook-up panel 28 includes monitor connector wires 32 for connecting to the respective temperature sensors for each heat pump under test and controlling connector wires 30 for connecting to respective tester heat exchangers 14 and respective controlled portions of each heat pump under test.

In a particularly preferred embodiment of the invention, there are fifteen testing stations 12. In this respect, a testing apparatus 10 is provided for simultaneously testing fifteen heat pumps 11. Specifically, this embodiment of the testing apparatus 10 of the invention includes an array of fifteen testing stations 12, wherein each of the testing stations includes two tester heat exchangers 14 for attachment to up to two designated components 16 of a selected heat pump. Each of the testing stations includes three temperature sensors 18 for placing against up to two designated components of the selected heat pump.

An array of fifteen groups of data acquisition channels are in communication with the array of fifteen testing stations. Each of the fifteen groups of data acquisition channels includes three data acquisition channels 24 for the three temperature sensors 18.

Preferably, the array of fifteen testing stations is organized into five groups of testing stations. In addition, each group of testing stations has three member testing stations.

Similarly, preferably, the array of fifteen groups of data acquisition channels is organized into five groups of data acquisition channels corresponding to the five groups of testing stations. Each of the five groups of data acquisition channels is organized into three groups of member data acquisition channels corresponding to the three member testing stations.

Each of the three groups of member data acquisition channels includes three data acquisition channels 24 for the three temperature sensors 18.

Also, each of the five groups of testing stations includes three control devices for controlling operation of heat pumps associated with the three member testing stations in each respective group of testing stations. In addition, five groups of device control channels 26 are provided, and each of the five groups of device control channels includes three device control channels for controlling the respective three control devices in each of the respective five groups of testing stations. Also, a device control system is provided for controlling the five groups of the three control devices.

The linear array of hook-up panels is grouped into five groups of hook-up panels. Each of the five groups of hook-up panels includes three unit hook-up panels 28. Each of the five groups of hook-up panels includes three groups of five (two plus three) controlling connector wires 30 for connecting to respective two tester heat exchangers 14 and respective three controlled portions of each heat pump 11 under test. Each of the five groups of hook-up panels includes three groups of three monitor connector wires 32 for connecting to the respective three temperature sensors for each heat pump 11 under test. In this respect, preferably, each unit hook-up panel 28 includes three monitor connector wires 32 for connecting to the respective three temperature sensors for each heat pump under test and five (two plus three) controlling connector wires 30 for connecting to respective two tester heat exchangers 14 and respective three controlled portions of each heat pump under test.

Using the preferred embodiment of the invention described above, a detailed testing procedure and detailed software protocol are described. Testing of refrigeration systems involves two basic sequences of steps. First there is set up of the refrigeration systems being tested. Next there is actually running the tests.

Two set up procedures are described below: one for type one refrigeration systems; and one for type two refrigeration systems.

For setting up testing any of the refrigeration systems, a test area is set up to handle up to 15 units at one time. The system is divided into 5 groups with hook-ups for up to 3 units in each group. Each group must have the same type of unit. More specifically, type one and type two units cannot be mixed in the same group of three member testing stations 12.

Figure 4:
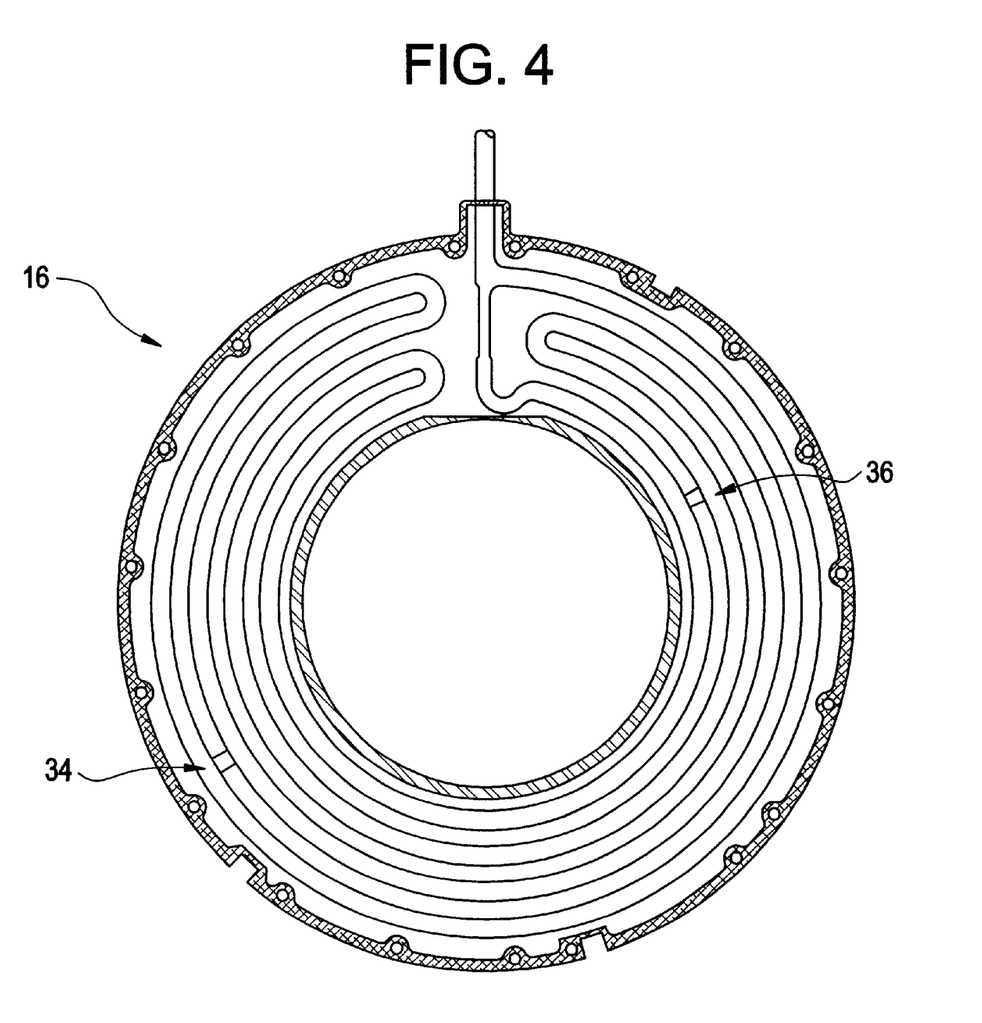
FIG. 4 is a cross-sectional view of an evaporator plate fitted with thermocouple sensors for measuring temperature changes of the evaporator plate as heat loads are applied to the evaporator plate during a testing cycle.

Here is a typical procedure for testing one, two, or three type one refrigeration systems simultaneously in one, two, or three member testing stations 12 in a group of testing stations.

a) A refrigeration system unit on a cart is moved over to a test station 12.

b) An evaporator plate is gently inserted into a heater holding fixture and the lid of the heater is raised. It is noted here that a designated component of the refrigeration system is the evaporator plate 16. It is further noted that a tester heat exchanger is a tester heater 14. It is further noted that the tester heater 14 is in a form of a clam shell, and the lid of the clam shell is lifted for insertion of the evaporator plate 16. It is noted that the evaporator plate 16 is connected to controlling connector wire 30 labeled "heater 1" in FIG. 2. It is noted that, for type one units, the controlling connector wire 30 labeled "heater 2" in FIG. 2 is not employed.

c) A small amount of white thermal grease is applied to two places on the evaporator plate 16. In FIG. 4, regarding the top of the evaporator plate 16, where tubing is attached to the evaporator plate 16, at a 12:00 O'Clock position, one amount of grease is applied at the 2:00 O'Clock position (reference numeral 34), and one amount of grease is applied at the 8:00 O'Clock position (reference numeral 36).

d) First temperature sensor 18, known as a T2 thermocouple, is applied to the greased 2:00 O'Clock position 34 with a small strip of aluminum tape. The first temperature sensor 18 is connected with monitor connector wire 32 labeled TC1 in FIG. 2. A second temperature sensors 18, known as a T8 thermocouple, is applied to the greased 8:00 O'Clock position 36 with aluminum tape. The second temperature sensor 18 is connected with monitor connector wire 32 labeled TC2 in FIG. 2. The thermocouples are affixed to the evaporator plate 16 between ridges on the evaporator plate 16. Each thermocouple end is embedded into the thermal grease. It is noted that the monitor connector wire 32 labeled TC3 in FIG. 2 is not connected to a thermocouple for testing the type one units.

e) The heater lid is closed and secured.

f) A cooling fan is mounted on the grill in front of the compressor.

g) The compressor cable is connected to test station compressor harness. More specifically, the compressor cable is connected to controlling connector wire 30 labeled "compressor" in FIG. 2.

h) The solenoid valve of the refrigeration systems is connected to controlling connector wire 30 labeled "valve 1" in FIG. 2. It is noted that for testing the type one refrigeration systems, the controlling connector wire 30 labeled "valve 2" in FIG. 2 is not employed.

i) A ground wire is connected to system ground with an attached alligator clip.

The procedure described above is repeated for each type one refrigeration system in a group.

For setting up for testing type two refrigeration systems the procedure set forth above for the type one systems is followed except for the following changes:

a) A T10 thermocouple is secured to a right tube on the hydration coil with plastic tie-wrap and aluminum tape. Tie-wrap end of thermocouple directly to tubing. It is noted that the hydration coil is a second designated component on the refrigeration system that undergoes test.

b) A foam strip is wrapped and secured around the T10 thermocouple. It is noted that the T10 thermocouple is a third temperature sensor 18. The T10 thermocouple is connected to the monitor connector wire 32 labeled "TC3" in FIG. 2.

c) A small heater is assembled to hydration coil. The small heater is a second tester heater that is not shown in the drawings. However, it is noted that the small heater for testing the hydration coil is connected to controlling connector wire 30 labeled "heater 2" in FIG. 2.

d) A three-way solenoid valve is connected to controlling connector wire 30 labeled "valve 2" in FIG. 2.

Once set up is complete, running the tests follows. Prior to starting a computer-controlled test, all connections are visually checked. Especially checked for are loose or broken thermocouple wires. Production serial numbers are verified.

Each PDAQ (with the expansion module) has sixteen digital outputs and thirty analog inputs. The PDAQs are connected to the computer system 20 with a USB port.

Figure 3A:
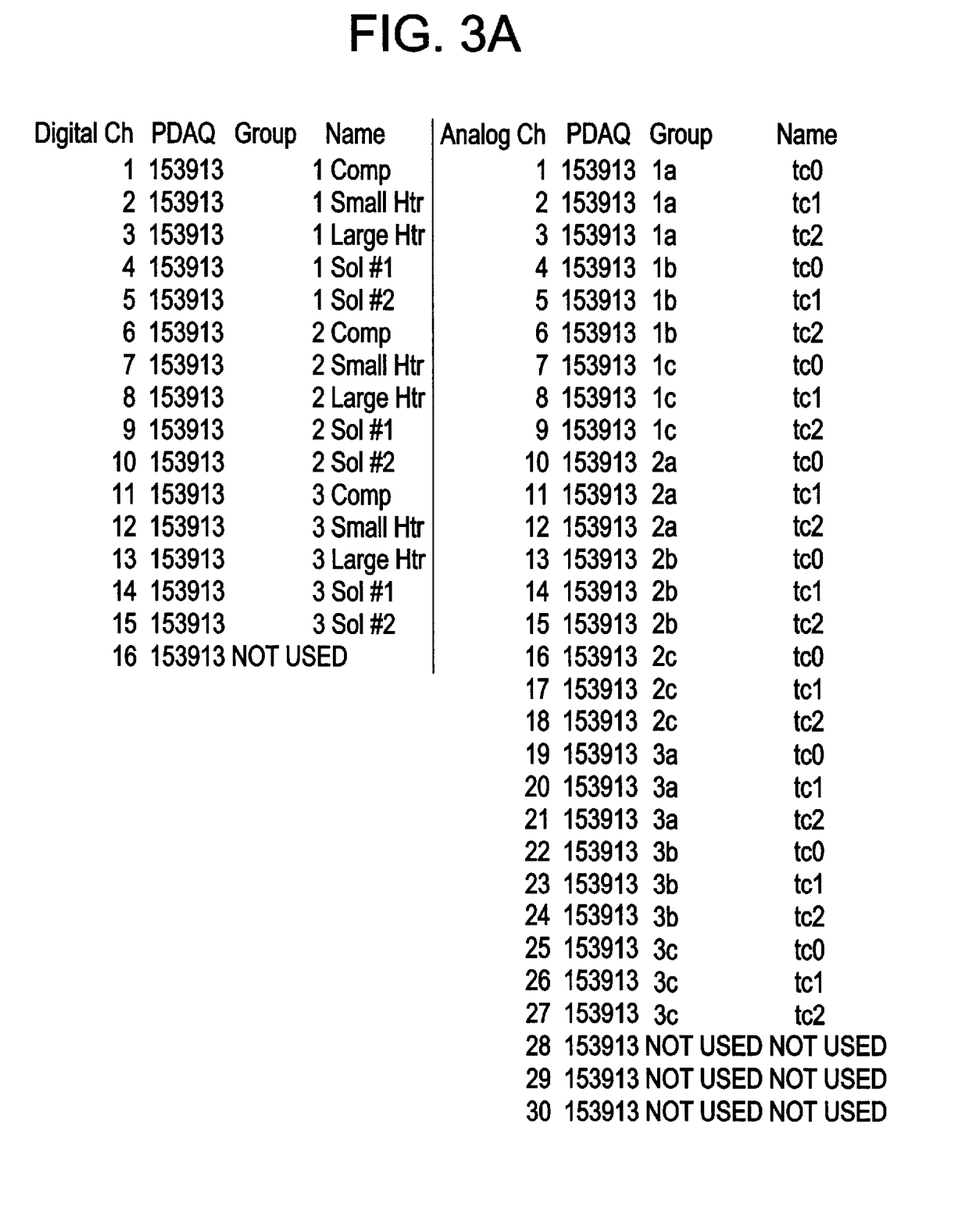
FIG. 3 is a table setting forth a map of data acquisition and control channel assignments for the PDAQ units in the testing system of FIG. 1.
Figure 3B:
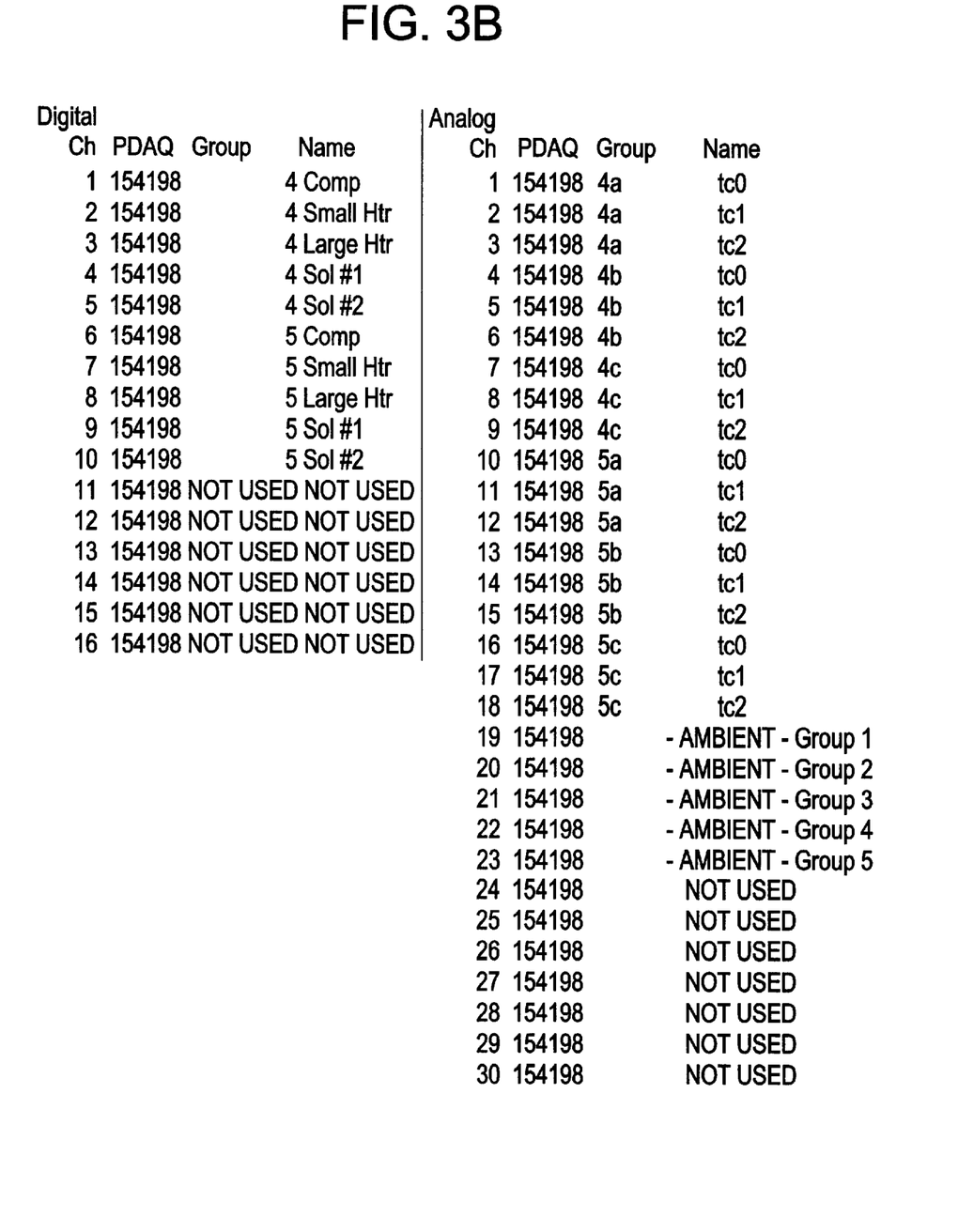

As shown in the table setting forth a map of data acquisition and control channel assignments for the PDAQ No. 1 and PDAQ No. 2 in FIG. 3, the PDAQ No. 1 has sixteen available digital output channels, and fifteen digital output channels are employed in each of five digital output channels in Groups 1, 2, and 3. The sixteenth digital output channel of PDAQ No. 1 is not employed in the preferred embodiment of the invention.

PDAQ No. 1 also has thirty available analog input channels. Analog input channels 1–3 are assigned to three temperature sensors 18 for the first member testing station in the first group of testing stations. Analog input channels 4–6 are assigned to three temperature sensors 18 for the second member testing station in the first group of testing stations. Analog input channels 7–9 are assigned to three temperature sensors 18 for the third member testing station in the first group of testing stations. Therefore, the first group of testing stations is assigned nine analog input channels. It is noted that channel "tc0" in FIG. 3 corresponds to monitor connector wire 32 "TC1" in FIG. 2. Similarly, channel "tc1" in FIG. 3 corresponds to monitor connector wire 32 "TC2" in FIG. 2. Also, channel "tc2" in FIG. 3 corresponds to monitor connector wire 32 "TC3" in FIG. 2.

The same pattern of input channel assignments is repeated for the second and third groups of testing stations. That is, the second group of testing stations is assigned analog input channels 10–18, and the third group of testing stations is assigned analog input channels 19–27. Thus, for the preferred embodiment of the invention, analog input channels 1–27 of PDAQ No. 1 are employed. Analog input channels 28–30 of PDAQ No. 1 are not employed with the preferred embodiment of the invention.

PDAQ No. 2 is used to provide the digital output channels and the analog input channels for the fourth and fifth groups of testing stations. PDAQ No. 2 also has sixteen available digital output channels, and ten digital output channels are employed in each of five digital output channels in Groups 4 and 5. The digital output channels 11–16 of PDAQ No. 2 are not employed in the preferred embodiment of the invention.

PDAQ No. 2 also has thirty available analog input channels. Analog input channels 1–3 are assigned to three temperature sensors 18 for the first member testing station in the fourth group of testing stations. Analog input channels 4–6 are assigned to three temperature sensors 18 for the second member testing station in the fourth group of testing stations. Analog input channels 7–9 are assigned to three temperature sensors 18 for the third member testing station in the fourth group of testing stations. Therefore, the fourth group of testing stations is assigned nine analog input channels. It is noted that channel "tc0" in FIG. 3 corresponds to monitor connector wire 32 "TC1" in FIG. 2. Similarly, channel "tc1" in FIG. 3 corresponds to monitor connector wire 32 "TC2" in FIG. 2. Also, channel "tc2" in FIG. 3 corresponds to monitor connector wire 32 "TC3" in FIG. 2.

The same pattern of input channel assignments is repeated for the fifth group of testing stations. That is, the fifth group of testing stations is assigned analog input channels 10–18. Thus, for the preferred embodiment of the invention, analog input channels 1–18 of PDAQ No. 2 are employed.

In addition, analog input channels 19–23 of PDAQ No. 2 are also employed. Analog input channel 19 is assigned to a fourth temperature sensor 18 which is used for measuring ambient temperature of the area of Group 1 testing stations. Analog input channel 20 is assigned to a fourth temperature sensor 18 which is used for measuring ambient temperature of the area of Group 2 testing stations. Analog input channel 21 is assigned to a fourth temperature sensor 18 which is used for measuring ambient temperature of the area of Group 3 testing stations. Analog input channel 22 is assigned to a fourth temperature sensor 18 which is used for measuring ambient temperature of the area of Group 4 testing stations. Analog input channel 23 is assigned to a fourth temperature sensor 18 which is used for measuring ambient temperature of the area of Group 5 testing stations.

Analog input channels 24–30 of PDAQ No. 2 are not employed with the preferred embodiment of the invention. It is noted that the five ambient temperature sensors for testing station Groups 1–5 are not shown in FIG. 2 to avoid complexity.

In partial review, with the preferred embodiment of the invention discussed above, the overall testing apparatus 10 includes an array of testing stations 12, tester heat exchangers 14, designated components 16 being tested, temperature sensors 18, data acquisition channels 24, groups of device control channels 26, groups of hook-up panels each of which contains unit hook-up panels 28, groups of controlling connector wires 30 per each of the g groups of hook-up panels, a data acquisition and control system 22, and a programmable monitoring and controlling computer system 20. Thus far herein, a detailed discussion has been presented with respect to the components of the overall testing apparatus 10 except for the programmable monitoring and controlling computer system 20. Before attention is directed to more details of the programmable monitoring and controlling computer system 20, attention is turned to a calculation which relates the capacity of a first tester heat exchanger 14 and the load that an evaporator plate 16 is designed to successfully handle. By way of example, if the capacity of the main evaporator test load should be 200 BTU/hr. That is, the evaporator plate 16 should handle a heat load of 200 BTU/hr. A typical tester heat exchanger 14 is an electrical resistance heater with the required wattage calculated as described below. First, 1 kw-hr=3415 BTU. Next, 1 kw=1000 watts. Using these conversion factors, 200 BTU/hr×1 kw-hr/3415 BTU×1000 watts/kw=58.57 watts. Therefore, the rating of the tester heat exchanger 14 that is selected for loading the evaporator plate 16 is 60 watts.

Attention is now turned to a calculation which relates the capacity of a second tester heat exchanger 14 and the load that hydration plate or coil is designed to successfully handle. More specifically, by way of example, if the hydration plate (also coil) test load is 20 BTU/hr. That is, the hydration plate or coil should handle a heat load of 20 BTU/hr. A typical second tester heat exchanger 14 is also an electrical resistance heater with its required wattage calculated as described below. First, 1 kw-hr=3415 BTU. Next, 1 kw=1000 watts. Using these conversion factors, the following calculation is performed:

$$20 \text{ BTU/hr} \times 1 \text{ kw-hr}/3415 \text{ BTU} \times 1000 \text{ watts/kw} = 5.857 \text{ watts}.$$

Therefore, the rating of the second tester heat exchanger that is selected for loading the hydration plate or coil is 6 watts.

Now attention is directed to more details of the programmable monitoring and controlling computer system 20. First, a safety switch 42 is provided to shut off electric power to the testing stations in the event of a power failure. The programmable monitoring and controlling computer system 20 includes a computer, such as a personal computer 40 and an interface for interfacing between the two PDAQ units and the personal computer. The interface includes analog-to-digital converters for converting analog signals from the temperature sensors 18 to digital signals that can be processed by the computer 40. The computer 40 includes computer software which performs a variety of functions for measurement, processing measurement data, using reference data, comparing finally processed measurement data to reference data, and comparing the finally processed measurement data to the reference data.

For example, the computer software includes instructions for monitoring and controlling the interface and the two PDAQ units. The computer software includes instructions for to collecting measurement data from the s temperature sensors 18 and logging the measurement data versus time, provided by the computer clock. The computer software includes instructions for processing the measurement data to arrive at finally processed measurement data.

The computer software includes instructions for obtaining the reference data and processing the reference data to obtain finally processed reference data.

Once the finally processed measurement data and the finally processed reference data have been obtained, the computer software employs instructions for comparing the finally processed measurement data with the finally processed reference data. Using that comparison, the computer software employs instructions for deciding whether or not the measurement data indicates that the tested units have passed or failed the tests. More specifically, the computer software decides whether or not the measurement data falls within an acceptable range of heat pump performance provided by the reference data. Once the comparison has been made the computer software generates either a pass or a failure status report which is sent to a printer 38.

Each of the individual software instructions described above, taken individually, can be written by a computer programmer having ordinary skill in the art. However, the combination of the computer instructions to carry out the combination of data acquisition, data processing, data comparing, and reporting functions performed by the computer software of the invention is novel and nonobvious.

More specifically, with respect to the programmable monitoring and controlling computer system 20, the testing software is written using Visual Basic 6.0 and is simply a data acquisition and control program. In a preferred embodiment, the software interfaces with two Omega PDAQs.

Currently, there are two production tests for refrigeration systems carried out by the programmable monitoring and controlling computer system 20 and one engineering test carried out by the programmable monitoring and controlling computer system 20. The production tests are for type two refrigeration systems and type one refrigeration systems, respectively. The software described herein is representative of the production test line in that there are five groups which can each have up to three devices under test. A test is chosen per group, and therefore type two refrigeration systems and type one refrigeration systems should not be mixed within a single group. Each refrigeration system within a group has two or three independent thermocouples attached/mounted to the refrigeration system according to the specific test. Each group also has an ambient thermocouple for measuring ambient temperature that is weighted with a small bottle to filter high frequency response of localized convection, etc. All tests have a one-minute resolution for control adjustment and thermocouple measurement. The Settings menu of the software has an All Relays Off utility, an Analog Test utility, and a Digital Test utility. All options in this menu facilitate the user's ensuring the desired result. The All Relays Off menu item ensures all twenty five control relays are off. The Digital Test menu selection allows the user to activate any one of the twenty-five relays for approximately ten seconds and then de-activate the relay. The Analog Test menu item allows the user to read a single thermocouple channel. There is also a supervisory circuit that will remove the twelve volts from the positive side of the coil for all twenty five control relays if the computer 40 5V source drops below 4.75 V. This circuit will therefore respond to brown out conditions as well as power loss. The PDAQs have also been programmed to have all the relays in the off mode upon power-up.

For example, Group 1, Serial Number Location A will have all of the data for the selected group test stored in a glsna.text file under the application directory. The ambient temperature is used to calculate the maximum and minimum temperatures for the given read. TC0 and TC1 are averaged and this average must be within the acceptable range. TC3 must also be within the calculated range. The maximum of the range is given by the formula $y=0.47x-14.854$, and the minimum of the range is given by the formula $y=0.47x-17.554$. If any step fails for a particular device, the report shows a failure for the step that failed, and a software LED is red at the end of the test for that particular device. Success is indicated by a green LED at the end of the test. On test initiation, all software LEDs are set to navy blue.

The ambient temperature is used to calculate the maximum and minimum temperatures for the given read. TC0 and TC1 are averaged and this average must be within the range. TC3 is not used for this test and N/A is the output to the hardcopy. The maximum of the range is given by the formula $y=0.27x-19.3$. If any step fails for a particular device the report shows failure for the step that failed, and a software LED is red at the end of the test for that particular device. Success is indicated by a green LED at the end of the test. On test initiation, all software LEDs are set to navy blue.

The Engineering test allows for custom testing and/or development. This mode can only be entered by entering a password. The user can enter up to ten steps, assign duration to each step of one to sixty minutes, and determine which control relays to activate/de-activate. It is noted that the last step should always be altered when no group is currently performing the test. The total number of steps must be greater than one to run the test. If not, upon initiation of the test, the user receives an error message. Setting the number of steps to one is actually deactivating the engineering test.

The above description and drawings are only illustrative of preferred embodiments which achieve the objects, features, and advantages of the present invention, and it is not intended that the present invention be limited thereto. Any modification of the present invention which comes within the spirit and scope of the following claims is considered to be part of the present invention.

What is claimed is:

1. Test system for testing a heat pump, comprising:
    a first heating element applied to a first component of said heat pump;
    a sensor connected to said heat pump;
    a data acquisition channel connected to said sensor;
    a control channel connected to a second component of said heat pump; and
    a control device which receives test data through said data acquisition channel and transmits control data over said control channel,
    wherein said first component of said heat pump is an evaporator coil and said second component of said heat pump is a compressor.

2. The test system of claim 1 wherein said sensor is a temperature sensor which is connected to said evaporator.

3. The test system of claim 2 further comprising a second control channel connected to a valve of said heat pump.

4. The test system of claim 3 further comprising a second data acquisition channel connected to a second temperature sensor wherein said second sensor is connected to said evaporator.

5. The test system of claim 4 wherein said control device is an automated testing protocol running on a computer system.

6. The test system of claim 5 wherein said automated testing protocol contains comparative pass/fail criteria.

7. Test system for testing a heat pump, comprising:
    a first heating means for providing heat to a first component of said heat pump;
    a sensor means connected to said heat pump for generating test data;
    a control means for receiving test data from said sensor means and transmitting control data to said heating means; and
    channel means for providing a conduit for test data to said control means from said sensor means and for providing a conduit for control data from said control means to said heating means.

8. The system of claim 7 wherein the channel means further provides a conduit for test data to said control means from a second sensor means, said second sensor means is also connected to said heat pump for generating test data.

9. The system of claim 8 wherein the channel means further provides a conduit for control data from said control means to a valve of said heat pump.

10. The system of claim 9 wherein said first component is an evaporator coil and wherein said sensor means are temperature sensors which are connected to said evaporator coil.

11. The system of claim 10 wherein said control means is an automated testing protocol running on a computer system.

12. A method of testing a heat pump, comprising the steps of:

providing a first control signal to a compressor of said heat pump to operate a function of said heat pump;

providing a second control signal to a heating element, said heating element placing a heat load on said heat pump, wherein said first and second control signals are generated by an automated testing protocol running on a computer system;

receiving data from a temperature sensor coupled to an evaporator of said heat pump;

comparing said received data to accepted performance parameters for said heat pump;

providing a third control signal to a valve of said heat pump;

receiving data from a second temperature sensor coupled to said evaporator; and providing a fourth control signal to an auxiliary heating element, said auxiliary heating element placing a heat load on said heat pump.

13. The method of claim 12 further comprising the step of printing a report of the results of the comparing step.

* * * * *